(12) United States Patent
Aldrich et al.

(10) Patent No.: US 6,654,502 B1
(45) Date of Patent: Nov. 25, 2003

(54) ADAPTIVE EARLY EXIT TECHNIQUES IN IMAGE CORRELATION

(75) Inventors: Bradley C. Aldrich, Austin, TX (US); Jose Fridman, Brookline, MA (US)

(73) Assignee: Intel Corporation, Santa Clara, CA (US)

( * ) Notice: Subject to any disclaimer, the term of this patent is extended or adjusted under 35 U.S.C. 154(b) by 699 days.

(21) Appl. No.: 09/589,630

(22) Filed: Jun. 7, 2000

(51) Int. Cl.$^7$ .................................................. G06K 9/36
(52) U.S. Cl. ...................... 382/236; 382/219; 382/278; 382/282; 375/240.2; 348/416.1
(58) Field of Search ................. 382/232, 236, 382/238, 246, 253, 276, 278, 282, 154, 209, 218, 217, 216, 219, 275, 220, 221, 222, 223, 224, 225; 348/699, 402.1, 407.1, 416.1; 375/240.2, 240.16, 240.22, 240.24, 240.27, 243, 254; 709/247; 708/422, 426

(56) References Cited

U.S. PATENT DOCUMENTS 6,031,582 A   2/2000  Nishikawa et al.

6,201,896 B1 * 3/2001 Ishikawa ..................... 382/236

FOREIGN PATENT DOCUMENTS

| EP | 0 373 291 | 6/1990 |
|----|-----------|--------|
| EP | 0 854 439 | 7/1998 |
| JP | 02-162914 | 6/1990 |
| JP | 11-219436 | 8/1999 |
| JP | 2000-069484 | 3/2000 |

OTHER PUBLICATIONS

Ki–Chul Nam et al. "A full–search block–matching algorithm with early retirement of processing elements." *Journal of the Korean Institute of Telematics & Electronics* vol. 32B No. 11 (1995).

* cited by examiner

Primary Examiner—Bhavesh M. Mehta
Assistant Examiner—Ali Bayat
(74) Attorney, Agent, or Firm—Fish & Richardson P.C.

(57) ABSTRACT

Plural sum of absolute difference devices are used to calculate distortions between specified parts of specified images in a video stream. The video can be from a video camera, or other device.

23 Claims, 5 Drawing Sheets

ADAPTIVE EARLY EXIT TECHNIQUES IN IMAGE CORRELATION

BACKGROUND

Image compression techniques can reduce the amount of data to be transmitted in video applications. This is often done by determining parts of the image that have stayed the same. The "motion estimation" technique is used in various video coding methods.

Motion estimation is an attempt to find the best match between a source block belonging to some frame N and a search area. The search area can be in the same frame N, or can be in a search area in a temporally displaced frame N-k.

These techniques may be computationally intensive.

BRIEF DESCRIPTION OF THE DRAWINGS

These and other aspects will now be described in detail with reference to the accompanying drawings, wherein.

DETAILED DESCRIPTION

Motion estimation is often carried out by calculating a sum of absolute differences or "SAD". Motion estimation can be used in many different applications, including, but not limited to cellular telephones that use video, video cameras, video accelerators, and other such devices. These devices can produce video signals as outputs. The SAD is a calculation often used to identify the lowest distortion between a source block and a number of blocks in a search region search block. Hence the best match between these blocks. One way of expressing this is $$SAD = \sum_{i=0}^{N-1} \sum_{j=0}^{n-1} |a(i, j) - b(i, j)|, N = 2, 4, 8, 16, 32, 64.$$

Figure 1:
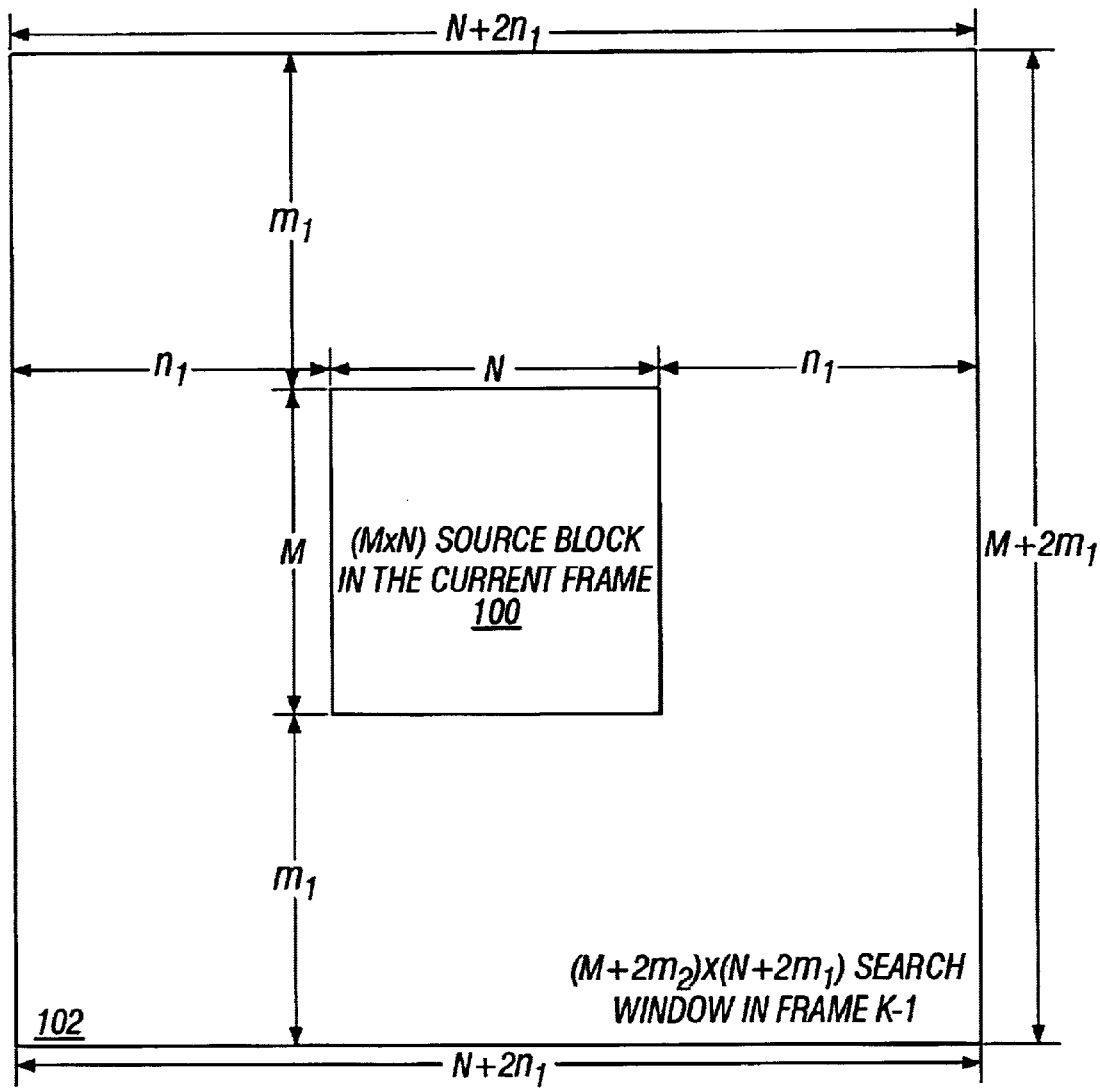
FIG. 1 shows a source block and search block being compared against one another.

Conceptually what this means is that a first frame or source block (N) is divided into component parts of M×N source blocks 100. These are compared to a second frame (N-K) 102. The frames can be temporally displaced, in which case k≠0. Each N-K frame 102 is an M+2m$_1$×N+2n$_1$ area. The source block 100 is shown in the center of the area in FIG. 1. The parts of the images that match can be detected by correlating each part of each image frame against other image frame using the distortion measurer. The compression scheme uses this detection to compress the data, and hence send less information about the image.

This device can also be part of a general-purpose DSP. Such a device is contemplated for use in video camcorders, teleconferencing, PC video cards, and HDTV. In addition, the general-purpose DSP is also contemplated for use in connection with other technologies utilizing digital signal processing such as voice processing used in mobile telephony, speech recognition, and other applications.

The speed of the overall distortion detection process can be increased. One way is by using hardware that allows each SAD device to carry out more operations in a cycle. This, however, can require more expensive hardware.

Another way is to increase the effective pixel throughput by adding additional SAD devices. This can also increase cost, however, since it requires more SAD devices.

Faster search algorithms attempt to use the existing hardware more effectively.

The block SAD compares the source group against the "search group". The source group and the search group move throughout the entire image so that the SAD operation calculates the overlap between the two groups. Each block in the source group will be compared to multiple blocks in each of the search regions.

A typical SAD unit operates on two, 16 by 16 elements to overlay those elements on one another. This overlay process calculates 16×16=256 differences. These are then accumulated to represent the total distortion.

The SAD requires certain fundamental operations. A difference between the source $X_{ij}$ and the search $Y_{ij}$ must be formed. An absolute value $|X_{ij}-Y_{ij}|$ is formed. Finally, the values are accumulated, $$SAD = \sum_{i=0}^{N-1} \sum_{j=0}^{n-1} |X_{ij} - Y_{ij}|.$$

Figure 2:
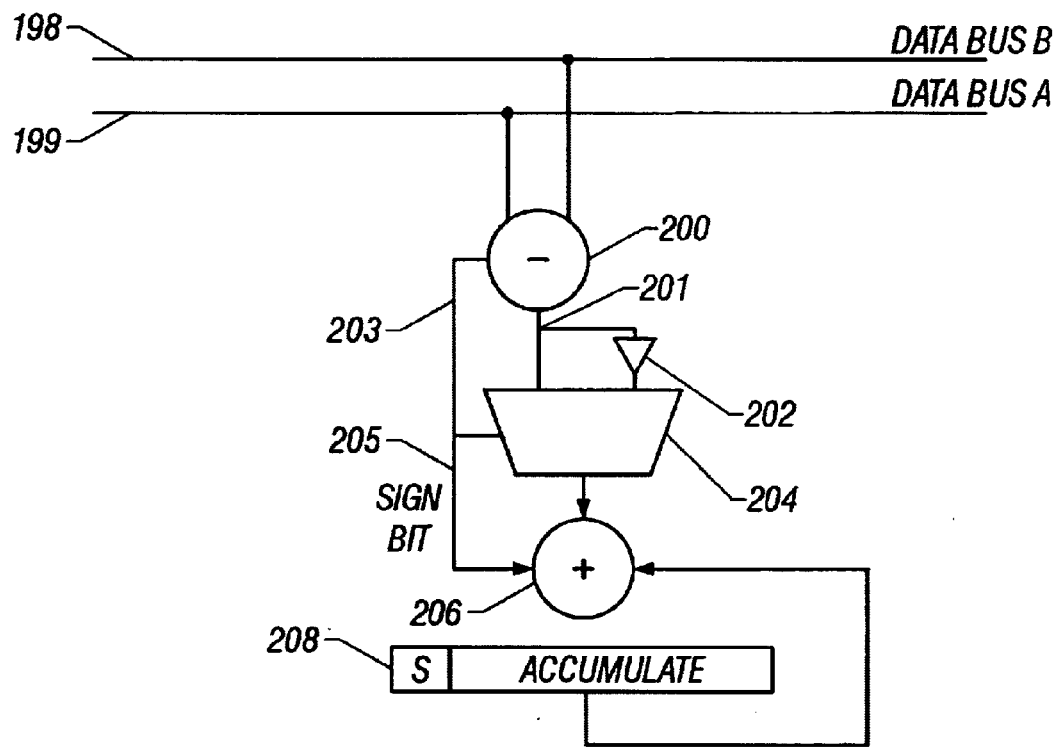
FIG. 2 shows a basic accumulation unit for measuring distortion.

A basic accumulation structure is shown in FIG. 2 Arithmetic logic unit 200 receives $X_{ij}$ and $Y_{ij}$ from data buses 198,199 connected thereto, and calculates $X_{ij}-Y_{ij}$. The output 201 is inverted by inverter 202. Both the inverted output, and the original, are sent to multiplexer 204 which selects one of the values based on a sign bit 205. A second arithmetic logic unit 206 combines these to form the absolute value. The final values are stored in accumulation register 208. Effectively, this forms a system of subtract, absolute, accumulate, as shown in FIG. 2.

FIG. 2 shows a single SAD computation unit. As noted above, multiple computation units could be used to increases the throughput. If the number of computation units is increased, that increases, in theory, the pixel throughput per cycle.

The present inventor noted, however, that increase in pixel throughput is not necessarily linearly related to the number of units. In fact, each frame is somewhat correlated with its neighboring frames. In addition, different parts of any image are often correlated with other parts of the image. The efficiency of the compression may be based on characteristics of the images. The present application allows using the multiple SAD devices in different modes, depending on the efficiency of compression.

Figure 3A:
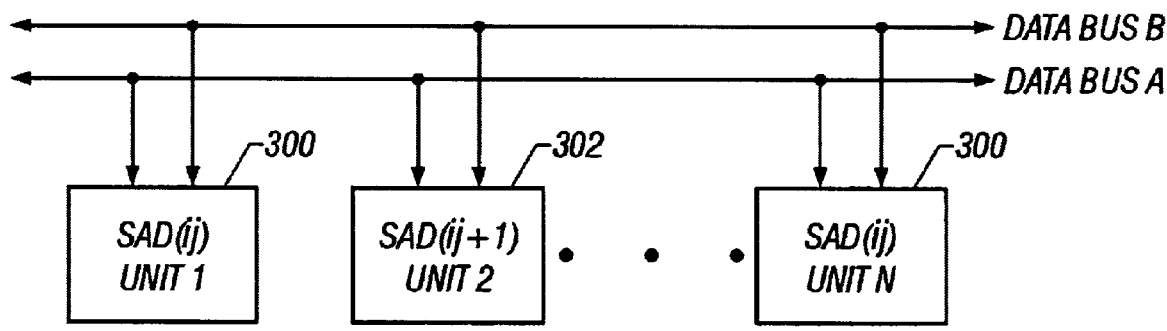
FIG. 3a and 3b shows different partitioning of the calculations among multiple SAD units.
Figure 3B:
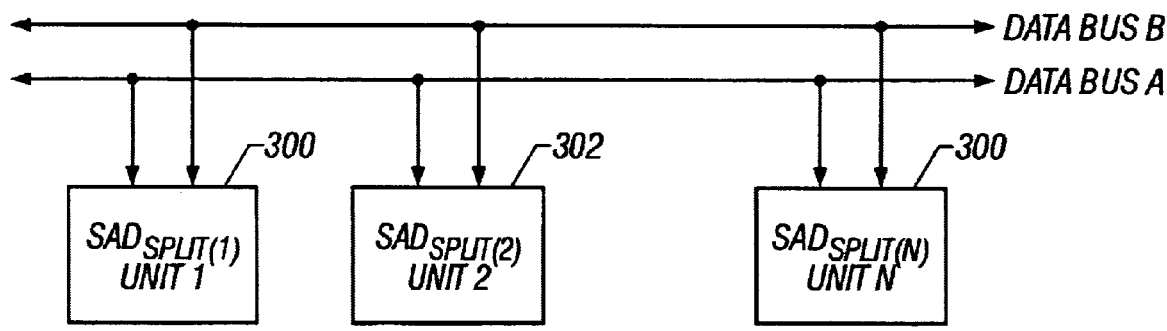

The present application uses the architecture shown in FIGS. 3A and 3B. The same connection is used in both FIGS. 3A and 3B, but the calculations are partitioned in different ways.

FIG. 3A shows each SAD device 300, 302 being configured as a whole SAD. Each SAD receives a different block, providing N block SAD calculations. Effectively, unit 301, therefore, calculates the relationship between a 16 by 16 reference and a 16 by 16 source, pixel by pixel. Unit 2, 302 calculates the result the difference 16 by 16 source and the 16 by 16 search pixel by pixel. The alternative shown in FIG. 3B. In this alternative, configuration each single SAD 300, 302 performs a fraction of a single block SAD calculation. Each of the N computation units provides 1/N of the output. This "partial SAD" operation means that each of the 8 bit subtract absolute accumulate units have calculated 1/N of the full SAD calculation configured to that unit.

The overall system that determines the whole or partial should be used based on previous results as described herein. This in turn can reduce the number of calculations that is carried out.

One way to determine whether whole or partial is used is to assume that temporally close images have correlated properties. A first cycle can be calculated using the whole SAD mode, and a second cycle can be calculated using the partial SAD mode. The cycle which works faster is taken as the winner, and sets the SAD mode. This calculation can be repeated every X cycles, where X is the number of cycles after which local temporal correlation can no longer be assumed. This can be done in a logic unit, which carries out the flowchart of FIG. 7, described herein.

Throughput can also be increased by an "early exit" technique as described herein.

The complete SAD calculation for 16×16 elements can be written as $|p_1r-p_1s|+|p_2r-p_2s|+ \ldots |p_{256}s-p_{256}r| \ldots$ (1). If all of these calculations were actually carried out, the calculation could take 256/N cycles, where N is the number of SAD units. It is desirable to stop the calculation as soon as possible. Interim results of the calculation are tested. These interim results are used to determine if enough information has been determined to find a minimum distortion. The act of testing, however, can consume cycles.

Figure 4:
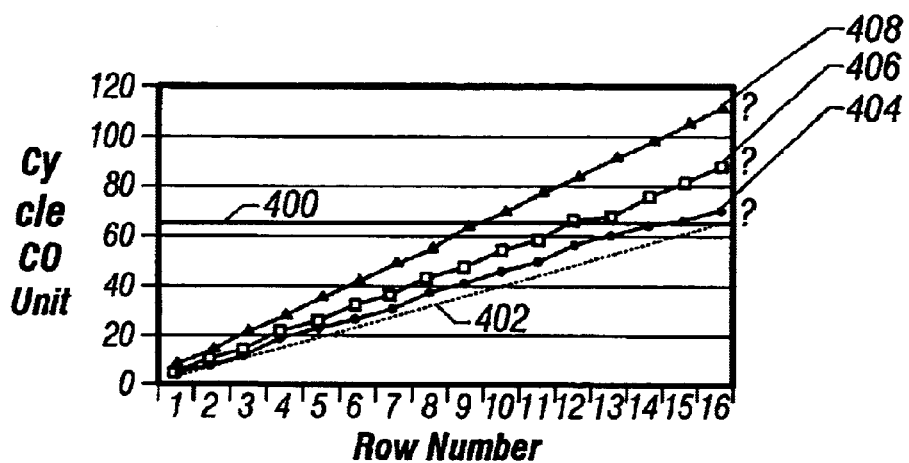
FIG. 4 shows a tradeoff between early exit strategy calculations and an actual total calculation.

The present application describes a balance between this consumption of cycles and the determination of the minimum distortion. FIG. 4 illustrates the tradeoff for a 16×16 calculation using 4 SAD devices. Line 400 in FIG. 4 represents the cycle count when there is no early exit. The line is horizontal representing that the cycle count without early exit is always 256/4=64.

The cycle counts for early exit strategies are shown in the sloped lines 402, 404, 406 and 408. Line 404 represents one test every sixteen pixels, line 406 represents one test every thirty-two pixels (⅛) and line 408 represents one test every sixty-four pixels (1/16). Note that when the lines 402–408 are above line 400, the attempt at early exit has actually increased the overall distortion calculation time. Line 402 represents the cycle consumption where zero overhead is obtained for exit testing. That is, when a test is made, the exit is always successful. Line 402 is the desired goal. An adaptive early exit scheme is disclosed for doing so.

Block I is first processed using any normal strategy known in the art to find a minimum distortion. This can be done using test patterns, which can be part of the actual image, to find the distortion. This minimum distortion is used as the baseline; and it is assumed that block I+n, where n is small, has that same minimum distortion. Two basic parameters are used.

Kexit(N) represents the number of pixels that have been processed previously for a search region before an early exit is achieved.

Aexit(N) represents the state of the partial accumulator sign bits, at the time of the last early exit for a search region.

For these blocks I+n, the SAD calculation is terminated when the distortion exceeds that threshold. This forms a causal system using previous information that is known about the search region.

The usual system is based on the image characteristics within a search region being some probability of maintaining common characteristics from time to time. The time between frames is between 1/15 and 1/30 of second, often fast enough that minimal changes occur during those times above some noise floor related to measurable system characteristics. Also, there are often regions of an image which maintains similar temporal characteristics over time.

According to the present application, the accumulator unit for each SAD can be loaded with the value (−least/n), where "least" represents the minimum distortion that is measured in the block motion search for the region. Many SAD's are calculated for each search region. The first SAD calculating for the region is assigned the "Least" designation. Future SADs are compared to this, to see if a new "Least" value has been established. When the accumulators change sign, the minimum distortion has been reached. Moreover, this is indicated using only the existing SAD structure, without an additional calculation, and hence additional cycle(s) for the test.

A test of the character of the image can be used to determine how many of the accumulators need to switch before establishing the early exit. For example, if source and target regions are totally homogeneous, then all the accumulators should change sign more or less at the same time. When this happens, any one of the running SAD calculations exceeding the previous least measurement can be used to indicate that an early exit is in order.

This, however, assumes total image homogeneity. Such an assumption does not always hold. In many situations, the multiple accumulators of the different SAD units will not be increasing at the same rate. Moreover, the different rate of increase between the accumulators may be related directly to the spatial frequency characteristics of the differences themselves, between the source and target block, and also to the method of sampling the data. This can require more complex ways of considering how to determine early exit, based on what happens with the SAD units.

One operation is based on the probability associated with a split SAD state; where not all of the SAD units are in the same state. This difference in rate of increase between the accumulators is related to the spatial frequency characteristics of the difference between the source and target block. Since these spatial frequency characteristics are also correlated among temporally similar frames, the information from one frame may also be applied to analysis of following frames.

This is explained herein with reference to variables—where $A_1, A_2, A_3 \ldots A_n$ are defined as events associated with a split SAD calculation.

The events can be defined as follows:

Event $A_i = SAD_i \geq 0$ where $SAD < 0$ for $i \neq j$.

This conceptually means that the event $A_i$ is defined as occuring when SAD unit i is positive and all the remaining SAD units are negative. This would occur, for example, when the accumulators were increasing at different rates. This can also be defined as combined events, specifically:

Event $B_{i,j} = A_i \cup A_j = SAD_i \geq 0$ for $SAD_j \geq 0$, and where $SAD_k < 0$ for $k \neq i, j$. This means that event $B_{i,j}$ is defined as "true" when $A_i$ exists and $A_j$ are true, but all other $A_k$ are false. The concept of defining the operations in terms of events can be extended to include all the possible combinations of i, j and k. This yields, for 4 SAD units, a total of 16 combinations. For larger numbers of SAD units, it leads to other numbers of combinations, and possibly using more variables, such as i, j, k and m or others.

Describing this scenario in words, each event "B" is defined as the sum of the specified accumulators being greater than 0. Each of these combinations is defined as a probability. For 4 SAD units, there are total of 16 possible states of accumulators. These can be grouped according to how they are handled.

A first trivial possibility is $$P(B|\bar{A}_1 \cap \bar{A}_2 \cap \bar{A}_3 \cap \bar{A}_4)=0.$$

This means that the probability that sum of the accumulators is >0, given that none of the accumulators has exceeded 0, is 0.

The opposite is also true:

$$P(B|A_1 \cap A_2 \cap A_3 \cap A_4)=1;$$

Which means that the probability of the sum of all the accumulators is set, given that none of them are set, is also 1.

Excluding these trivial characteristics, there are 14 non-trivial combinations. The first group includes four cases where one of the accumulators is set and the remaining three are not set:

$P(B|A_1 \cup (\bar{A}_2 \cap \bar{A}_3 \cap \bar{A}_4)),$
$P(B|A_2 \cup (\bar{A}_1 \cap \bar{A}_3 \cap \bar{A}_4)),$
$P(B|A_3 \cup (\bar{A}_1 \cap \bar{A}_2 \cap \bar{A}_4)),$
$P(B|A_4 \cup (\bar{A}_1 \cap \bar{A}_2 \cap \bar{A}_3)).$ Another group represents those conditions where two of the accumulators are set, and the other two accumulators are not set. These combinations are written as:

$P(B|A_1 \cap A_2) \cup (\bar{A}_3 \cap \bar{A}_4)$
$P(B|A_1 \cap A_3) \cup (\bar{A}_2 \cap \bar{A}_4)$
$P(B|(A_1 \cap A_4) \cup (\bar{A}_2 \cap \bar{A}_3)$
$P(B|A_2 \cap A_3) \cup (\bar{A}_1 \cap \bar{A}_4)$
$P(B|A_2 \cap A_4) \cup (\bar{A}_1 \cap \bar{A}_3)$
$P(B|A_3 \cap A_4) \cup (\bar{A}_1 \cap \bar{A}_2)$ Finally, the following group represents the cases where three accumulators are set and one accumulator is not set $P(B|A_1 \cap A_2 \cap A_3) \cup \bar{A}_4)$
$P(B|A_2 \cap A_3 \cap A_4) \cup \bar{A}_1)$
$P(B|A_1 \cap A_3 \cap A_4) \cup \bar{A}_2)$
$P(B|A_1 \cap A_2 \cap A_4) \cup \bar{A}_3).$ The present embodiment recognizes that each of these groups, and in fact each of these situations, represents a different condition in the image. Each group or each situation can be handled differently.

Figure 5:
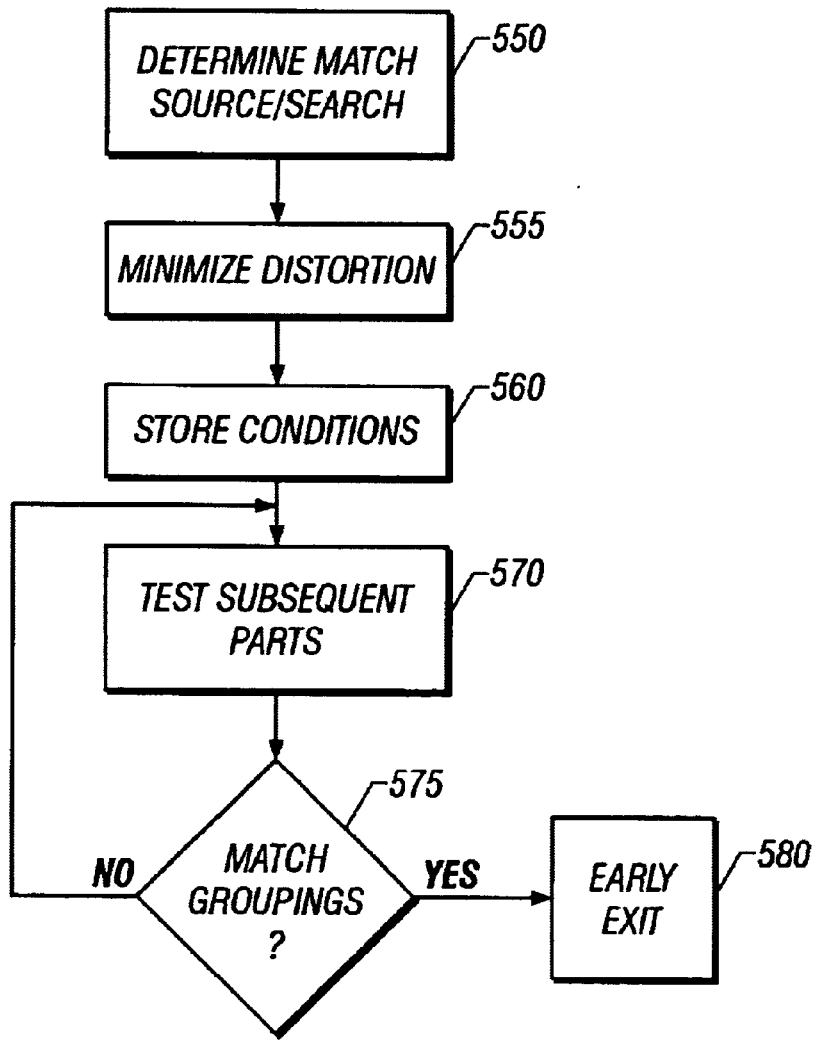
FIG. 5 shows a flowchart of the early exit strategy.

This system operates as above, and as described with reference to the flowchart of FIG. 5. The final goal is to complete the calculation, and hence to exit, sooner. This is shown in FIG. 5 by first, determining matching characteristics of two images; a source image and a search image at 550. The matching characteristics are calculated without any early exit. The minimum distortion is found at 555 and the conditions when that minimum distortion existed are found at 560.

The conditions at 560 can include a grouping type that existed at the time of minimum distortion, or the specific condition among the 14 possibilities.

At 570 a subsequent image part is tested. This subsequent part can be any part that is correlated to the test part. Since temporally correlated images are assumed to be correlated, this can extend to any temporally correlated part.

The image source and search are tested, and a determination of the specific groupings that occurred at the time of minimum distortion is found at 575. An early exit is then established, at 580.

The early exit, once determined, can be carried out in a number of different ways.

Figure 6A:
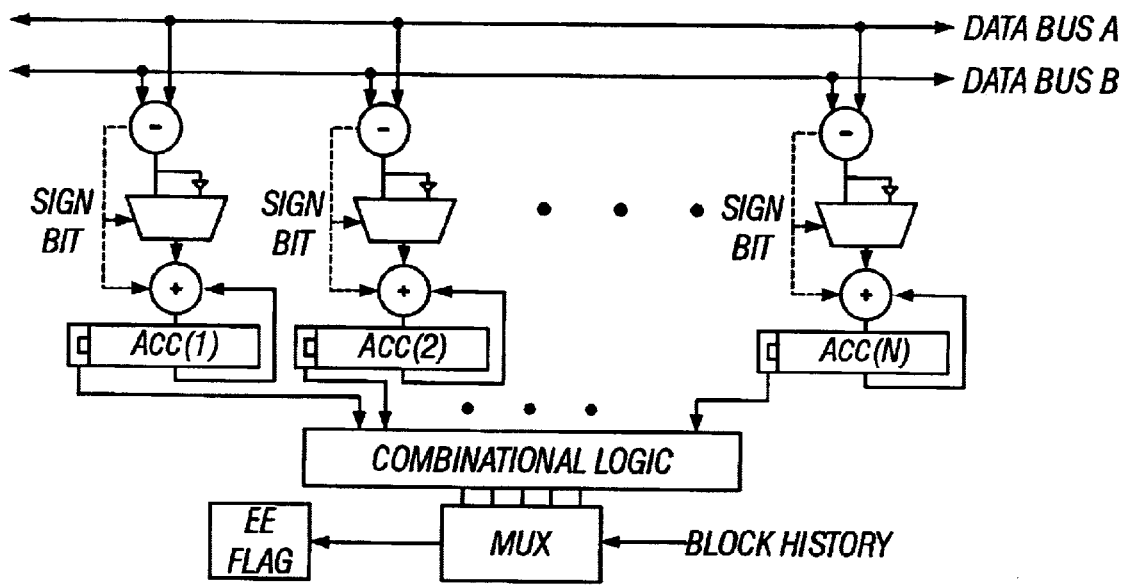
FIG. 6a shows an early exit using an early exit flag.

FIG. 6a shows a system of carrying out the early exit using an early exit or "EE" flag. N SAD units are shown, where in this embodiment, N can be 4. Each SAD unit includes the structure discussed above, and specifically ALUs, inverters, and accumulators.

The output of each of the accumulators is coupled to a combinatorial logic unit 600 which arranges the outputs. This can be used to carry out the group determination noted above. The combinatorial logic unit is carried out using discrete logic gates, e.g., defined in hardware definition language. The gates are programmed with an option based on the selected group. Different images and parts may be processed according to different options.

For each option, the combination of states, e.g., the group discussed above, is coded. The combinatorial logic monitors the accumulators of all the SAD units. Each state is output to a multiplexer.

When those accumulators achieve a state that falls within the selected coding, an early exit flag is produced. The early exit flag means that the hardware has determined an appropriate "fit". This causes the operation to exit.

Figure 6B:
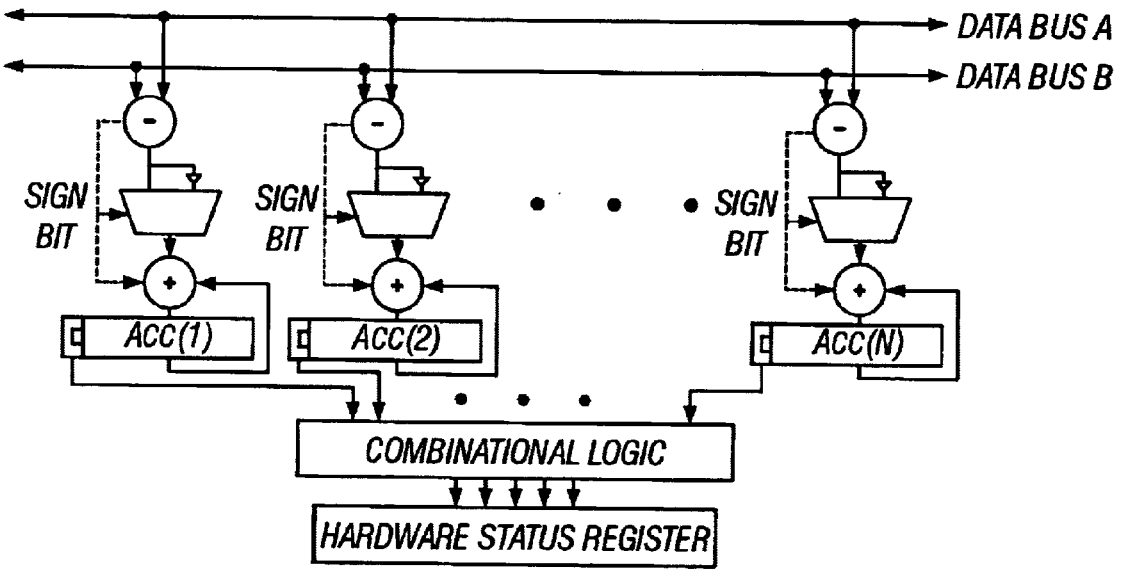
FIG. 6b shows early exit using a hardware status register.

FIG. 6B shows an alternative system, in which the states of the accumulators are sensed by a hardware status register 600. The status register is set to a specified state by the condition of the accumulators. The status register stores the specified condition that represents the early exit. When that specified condition is reached, the early exit is established.

Figure 7:
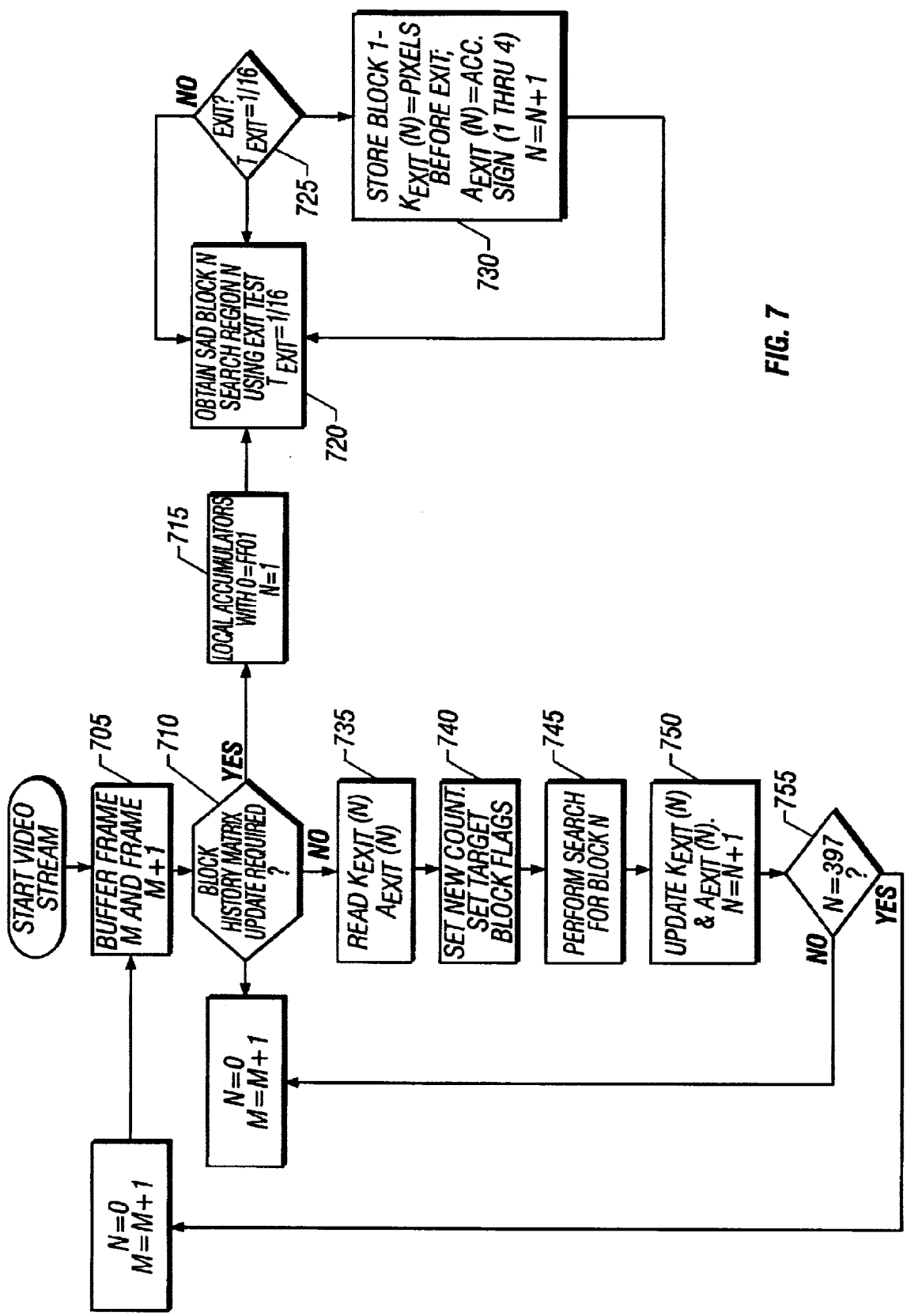
FIG. 7 shows a flowchart of operation of the adaptive early exit strategy.

The way in which the adaptive early exit is used, overall, is described in reference to FIG. 7. At 700, the video frame starts. 705 represents buffering both frame M and frame M+1. 710 is a determination if the block history model needs update. This can be determined by, for example, monitoring of the time since a previous frame update. For example, x seconds can be established as a time before a new update is necessary.

If the model needs updating, then the process continues by loading the accumulators with 0xFF01 and setting the local variable N=1 at 715. At 720, the system obtains SAD search region N and uses the periodic exit test $T_{exit} = \frac{1}{16}$ ..., at step 725 the exit test is performed. If successful, a local variable Kexit(N), which is the pixels before exit and Aexit(N) which is an summary of accumulators 1 through 4 before exit restored. The local variable n is also incremented at step 730. This establishes the local parameters, and the process continues.

In a subsequent cycle the block history of update does not need to be redone at step 710, and hence control passes to step 735. At this step, the previously stored Kexit and AEexit are read. This is used as the new count at step 740 to set target block flags.

At step 745, a search for block N is established, an a exit and Kexit are updated at step 750. N is incremented. At step 755, a determination is made whether N is equal to 397. 397 is taken as the number of frames in the buffer, since there are 396, 16×16 blocks in a 352×288 image. However, this would be adjusted for different size sizes as applicable.

Again, the temporal variations of large portions of an image are likely to remain unchanged. Therefore, when the partial accumulators have a specific sign bit, their state produces significant advantages. Moreover, the time between frames is usually on the order of 1/15 to 1/30 of a second. Finally, regions within the image maintain their localized characteristics, and therefore their spatial frequency may be correlated.

Although only a few embodiments have been disclosed, other modifications are possible.

What is claimed is:

1. An apparatus, comprising:
   a plurality of image manipulating devices, each operating to determine similarities between two image parts; and
   a mode switching element, which configures each of said image manipulating devices to determine an entire calculation in a first mode, and configures each of said image manipulating devices to determine only a portion of an entire calculation in a second mode.

2. An apparatus as in claim 1, wherein said image manipulating devices are sum of absolute difference ("SAD") devices.

3. An apparatus as in claim 2, wherein said first mode is a whole SAD mode, in which each SAD receives a different block and source section, and calculates a difference between the whole block and the whole source.

4. An apparatus as in claim 3, wherein said SADs calculate differences between a 16 by 16 reference and a 16 by 16 source, pixel by pixel.

5. An apparatus as in claim 4 wherein in said first mode, the unit calculates a relation between the entire 16 by 16 reference and the 16 by 16 source, and in said second mode, the unit calculates a fraction of the entire calculation.

6. An apparatus as in claim 2, wherein said second mode is a mode in which each single SAD performs a fraction of a single block SAD calculation.

7. An apparatus as in claim 6, wherein there are N of said SADs, and each of the N computation units provides 1/N of a total output.

8. An apparatus as in claim 1, further comprising a testing element that determines and selects said first mode or said second mode.

9. An apparatus as in claim 1 further comprising a logic unit which detects which of said modes will produce a desired result, and configures a calculation to said mode.

10. A distortion calculating device, comprising;
    a plurality of sum of absolute difference devices, each operating to calculate a total distortion between two image parts; and
    a calculation partitioning element which partitions a calculation between said sum of absolute difference devices based on characteristics of the two image parts.

11. A device as in claim 10 wherein said calculation partitioning element is a switching element which switches between different configurations in which the different sum of absolute difference devices calculate different amounts of a total output calculation.

12. A device as in claim 11 further comprising a logic unit which determines a proper mode of operation.

13. A device as in claim 10 wherein there are said N of said sum of absolute difference devices, and in a first mode, each of said sum of absolute difference devices calculates 1/N of a total calculation.

14. A device as in claim 10, further comprising a logic element that determines said characteristics, and controls said calculation partitioning element based on said characteristics.

15. A device as in claim 14, wherein said calculation is partitioned so that all of a calculation is done by a single sum of absolute difference device.

16. A device as in claim 14, wherein said calculation is partitioned so that only part of a calculation is done by a single sum of absolute difference device.

17. A method of processing an image comprising;
    simultaneously calculating image distortions in a plurality of image distortion calculating devices; and
    configuring said image distortion calculating devices in a first mode in which each device calculates a whole calculation and a second mode in which each device calculates only a part of a calculation.

18. A method as in claim 17 further comprising calculating a whole calculation in said first device representing a distortion between a source block and a search block.

19. A method as in claim 17 further comprising testing to determine which of a first or second mode will operate more efficiently, and configuring said multiple devices into said first or second mode depending on said testing.

20. A method of processing an image comprising:
    calculating a difference between two image parts in a plurality of separate devices; and
    configuring said devices in a first mode in which each device calculates a whole calculation and a second mode in which each device calculates only a part of a calculation.

21. A method as in claim 20, wherein said devices are sum of absolute difference devices.

22. A calculating device, comprising:
    a video device producing output video signals;
    a plurality n of sum of absolute difference ("SAD") devices, each having a subtract device, an absolute device, and an accumulator, connected to receive said video signals; and
    a mode changing device, changing a mode of operation between a first mode in which each SAD device calculates a difference between two image parts of said video signals, and a second mode in which each SAD device calculates 1/N of a total of said video signals.

23. A device as in claim 21, wherein said video device is a video camera.

* * * * *